(12) United States Patent
Kim et al.

(10) Patent No.: US 7,903,093 B2
(45) Date of Patent: Mar. 8, 2011

(54) MOBILE COMMUNICATION DEVICE EQUIPPED WITH TOUCH SCREEN AND METHOD OF CONTROLLING OPERATION THEREOF

(75) Inventors: Tae Hun Kim, Inchun-si (KR); Soo Duk Kim, Gwangmyung-Si (KR)

(73) Assignee: LG Electronics Inc., Seoul (KR)

( * ) Notice: Subject to any disclaimer, the term of this patent is extended or adjusted under 35 U.S.C. 154(b) by 696 days.

(21) Appl. No.: 11/790,859

(22) Filed: Apr. 27, 2007

(65) Prior Publication Data

US 2008/0174564 A1      Jul. 24, 2008

(30) Foreign Application Priority Data

Jan. 20, 2007     (KR) .................. 10-2007-0006381

(51) Int. Cl.
*G09G 5/00* (2006.01)
(52) U.S. Cl. .......... 345/173; 345/156; 386/210; 715/768
(58) Field of Classification Search .................. 348/148, 348/333.02, 333.05, 333.07; 345/156, 173; 715/768
See application file for complete search history.

(56) References Cited

U.S. PATENT DOCUMENTS

| | | | |
|---|---|---|---|
| 5,638,501 A | 6/1997 | Gough et al. | |
| 5,815,141 A | 9/1998 | Phares | |
| 2003/0001899 A1 | 1/2003 | Partanen et al. | |
| 2003/0142132 A1* | 7/2003 | Brown et al. | 345/768 |
| 2003/0210270 A1 | 11/2003 | Clow et al. | |
| 2004/0098195 A1* | 5/2004 | Listle et al. | 701/211 |
| 2004/0183834 A1 | 9/2004 | Chermesino | |
| 2006/0033724 A1 | 2/2006 | Chaudhri et al. | |
| 2006/0059432 A1 | 3/2006 | Bells | |
| 2006/0184896 A1 | 8/2006 | Foucher et al. | |
| 2008/0057926 A1* | 3/2008 | Forstall et al. | 455/415 |

FOREIGN PATENT DOCUMENTS

| | | |
|---|---|---|
| EA | 1 607 847 A1 | 12/2005 |
| KR | 10-2005-0077209 A | 8/2005 |
| KR | 10-2006-0008089 A | 1/2006 |
| WO | WO 02/37254 A1 | 5/2002 |
| WO | WO 2004/111816 A2 | 12/2004 |

\* cited by examiner

*Primary Examiner* — Huy T Nguyen
(74) *Attorney, Agent, or Firm* — Birch, Stewart, Kolasch & Birch, LLP

(57) ABSTRACT

A mobile communication device equipped with a touch screen and a method of controlling an operation of the mobile communication device are provided. According to an embodiment, the method includes displaying a display window on the touch screen, and displaying an input window overlapping a portion of the display window, wherein the input window is at least partially transparent.

10 Claims, 11 Drawing Sheets

MOBILE COMMUNICATION DEVICE EQUIPPED WITH TOUCH SCREEN AND METHOD OF CONTROLLING OPERATION THEREOF

CROSS-REFERENCE TO RELATED APPLICATION

This application claims the priority benefit of Korean Patent Application No. 10-2007-0006381, filed on Jan. 20, 2007 in Republic of Korea, the disclosure of which is incorporated herein by reference.

BACKGROUND OF THE INVENTION

1. Field of the Invention

The present invention relates to a mobile communication device equipped with a touch screen which is capable of displaying an input window selectively as a transparent window so that the input window can be laid over a display window, and to a method of controlling an operation of the mobile communication device.

2. Description of the Related Art

Various new technologies have been widely applied to mobile communication devices such as mobile phones or personal digital assistants (PDAs). Recently, public attention has been increasingly drawn to the application of Phase change Random Access Memory (PRAM) chips as core chips and the application of ultra high pixel Complementary Metal-Oxide Semiconductor (CMOS) chips as camera modules. Future trends in the design of mobile communication devices are expected to be dominantly led by mobile communication devices equipped with full touch screens and double-sided liquid crystal displays (LCD) which can display independent images on both sides thereof.

Double-sided LCDs and full touch screens have received more and more public attention because double-sided LCDs can help reduce the size of mobile communication devices while enabling a variety of designs, and because full touch screens can make keypads, which are a basic element of conventional mobile communication devices, unnecessary.

However, given that the design of mobile communication devices must ensure both portability and mobility, there is a clear limit in allocating space to input/output devices such as display devices or input devices for the mobile communication devices. More specifically, the size of touch screens for the mobile communication devices is generally limited. Thus, in order for a mobile communication device to serve as both an input device and a display device at the same time using a full touch screen without a requirement of a keypad, it is necessary to develop efficient methods of controlling the operation of a mobile communication device.

SUMMARY OF THE INVENTION

Accordingly, one object of the present invention is to address the above-noted and other problems associated with the related art.

Another object of the present invention is to provide a mobile communication device equipped with a touch screen which is capable of displaying an input window for inputting characters and others in response to touch inputs to the touch screen, as a transparent window, so that the input window can be laid over a display window, and to provide a method of controlling an operation of the mobile communication device.

Another object of the present invention is to provide a mobile terminal including a touch-sensitive input window for receiving a user's input, and a display window for displaying the user's input and other information, wherein the touch-sensitive input window is laid over a portion of the display window, and the touch-sensitive input window can be controlled to have a desired degree of transparency, so that the portion of the display window below the touch-sensitive input window can still be viewed through the touch-sensitive input window.

Another object of the present invention is to provide a mobile terminal and its method, wherein a transparency level of an input window overlaid on a display window can be selectively varied by a user.

To achieve these and other advantages and in accordance with the purpose of the present invention, as embodied and broadly described herein, the present invention provides, in one aspect, a method of controlling an operation of a mobile communication device equipped with a touch screen, the method including displaying a display window on the touch screen and, if an input window for inputting a character is displayed in response to a touch input to the touch screen, displaying the input window over the display window as a transparent window (or as a substantially transparent window). The input window may be displayed when the display window is touched.

According to an embodiment of the present invention, displaying the input window as a transparent window, may include selecting an operation menu item displayed on the touch screen in response to a touch input to the touch screen, and displaying a menu screen for selecting one of a plurality of input windows, and displaying the selected one of the plurality of input windows.

In another aspect, the present invention provides a mobile communication device, including a touch screen and a controller configured to display a display window on the touch screen and, if an input window for inputting a character is displayed in response to a touch input to the touch screen, to control the input window to be displayed over the display window as a transparent (or substantially transparent) window.

According to still another aspect, the present invention provides a method of controlling an operation of a mobile communication device equipped with a touch screen, the method comprising: displaying a display window on the touch screen; and displaying an input window overlapping a portion of the display window, wherein the input window is at least partially transparent.

According to still another aspect, the present invention provides a mobile communication device, comprising: a touch screen; and a controller configured to a display window on the touch screen and to display an input window overlapping a portion of the display window, wherein the input window is at least partially transparent.

It is to be understood that both the foregoing general description and the following detailed description of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE PREFERRED EMBODIMENTS

The preferred embodiments of the present invention will now be described more fully with reference to the accompanying drawings, in which exemplary embodiments of the invention are shown.

Figure 1:
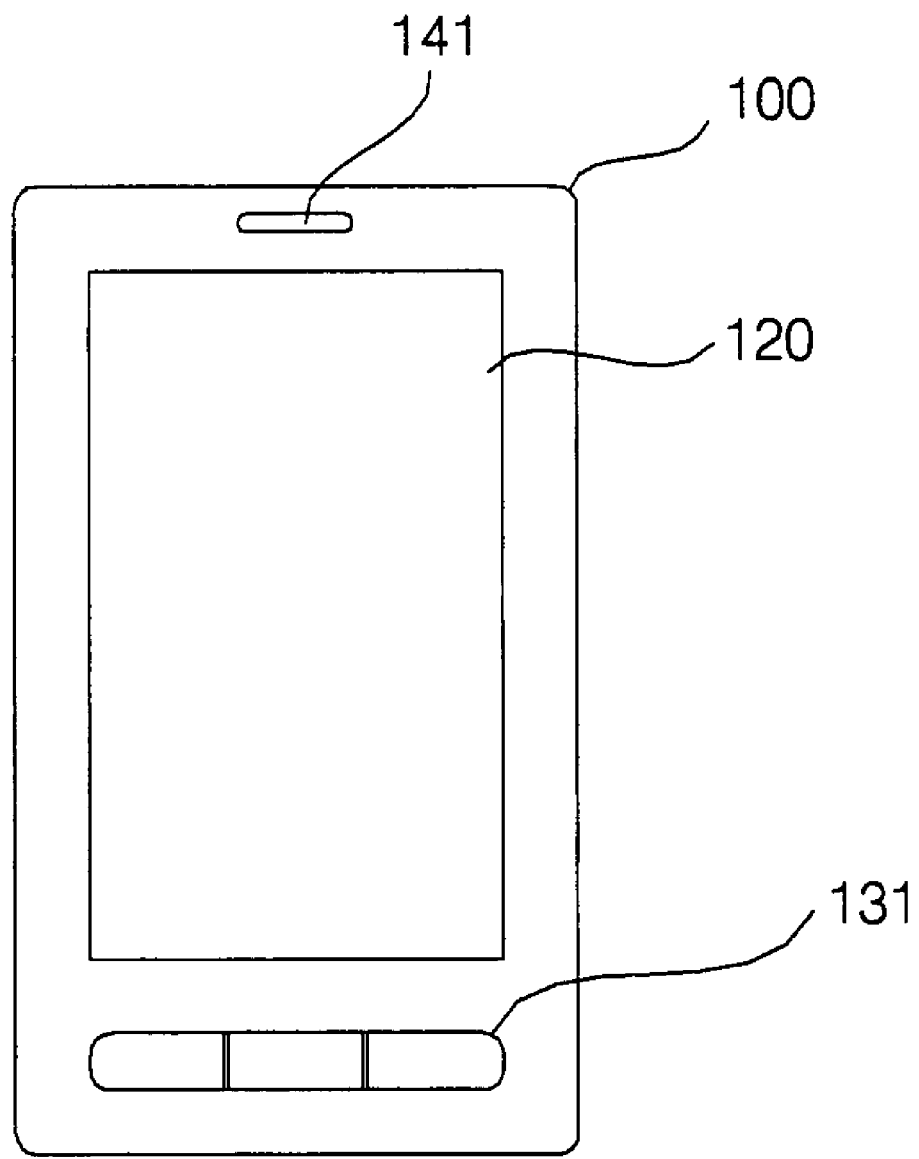
FIGS. 1 and 2 are perspective views of a mobile communication device according to an embodiment of the present invention.
Figure 2:
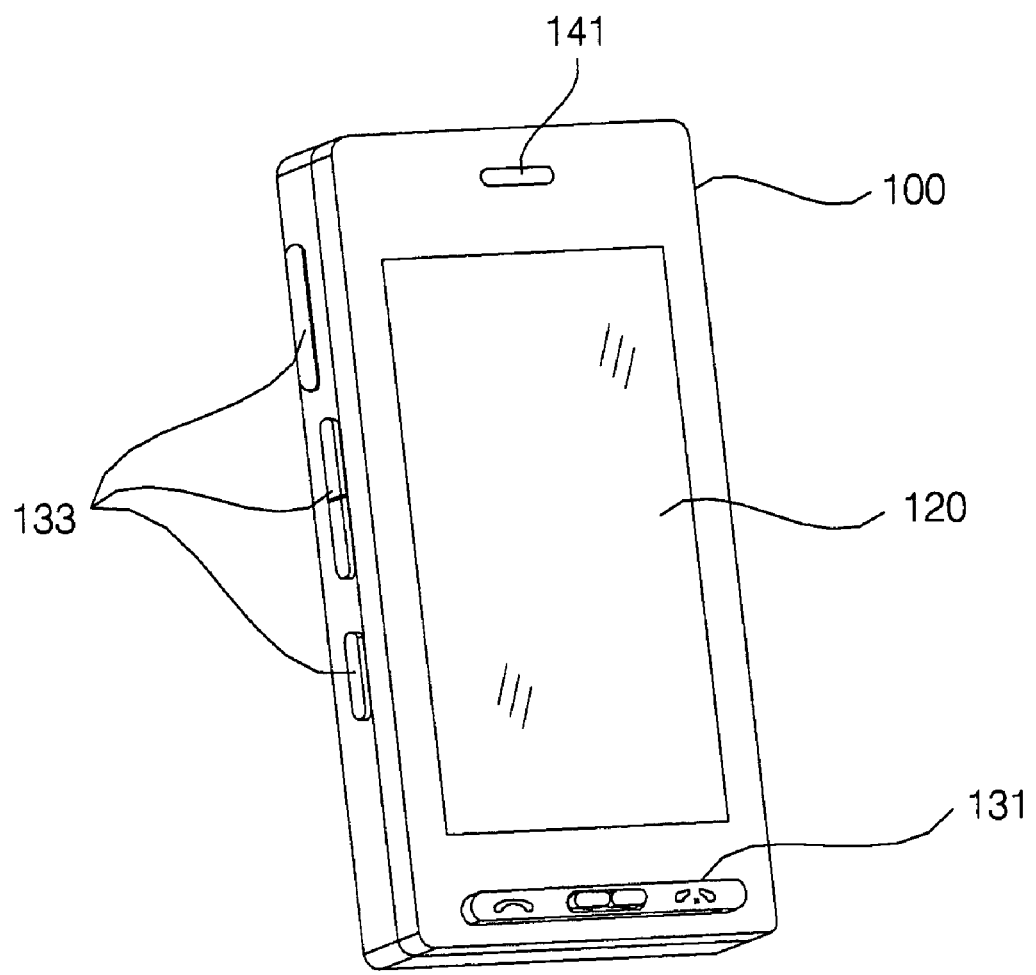

FIGS. 1 and 2 illustrate the exterior of a mobile communication device 100 according to an embodiment of the present invention. The mobile communication device 100 (also referred to as a mobile terminal) can be a mobile phone, a smart phone, a PDA, a combination thereof, any other portable communication device having a touch screen, etc.

Referring to FIGS. 1 and 2, the mobile communication device 100 includes a receiver 141 which is disposed on a front surface of the mobile communication device 100 and outputs a voice signal of a correspondent during a phone conversation with the correspondent, a touch screen 120 which can be used as both an input device and a display device, and one or more manipulation keys 131 which are used to receive or terminate a call and/or to provide other functions. Manipulation keys 133 for increasing or reducing the volume or performing camera functions may be disposed on one side of the mobile communication device 100.

The touch screen 120 is a display device which responds to touch inputs from a user. More specifically, the touch screen 120 allows the user to interact with the mobile communication device 100 by touching pictures, characters, menu items, etc. displayed on the touch screen 120, preferably with a finger. That is, the touch screen 120 can function as an input device and/or a display device.

Figure 3:
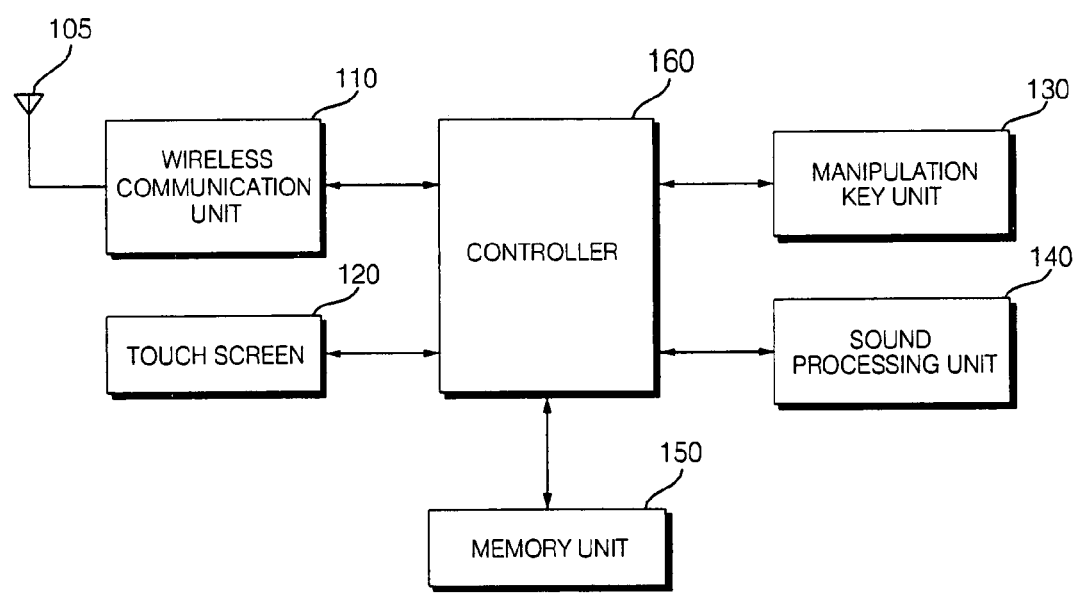
FIG. 3 is a block diagram of a mobile communication device according to an embodiment of the present invention.

FIG. 3 is a block diagram of a mobile communication device according to an embodiment of the present invention. The mobile communication device shown in FIG. 3 can be the mobile communication device 100 of FIGS. 1 and 2, or can be any other mobile device having different designs and styles with a touch screen 120 therein.

Referring to FIG. 3, the mobile communication device includes a wireless communication unit 110, a touch screen 120, a manipulation key unit 130 (which may include, e.g., the manipulation keys 131, 133 shown in FIG. 2), a sound processing unit 140, a memory unit 150, and a controller 160. The mobile communication device can have other known components such as a camera, etc. All the components of the mobile communication device are operatively configured and coupled.

The wireless communication unit 110 provides an interface for wireless communication with a base station through an antenna 105. Further, the wireless communication unit 110 preferably includes a duplex filter for filtering a signal received through the antenna 105, a power amplifier for amplifying a transmitting signal, a frequency up-convert circuit/unit in a transmission path, a frequency down-convert circuit/unit in a reception path, etc.

The touch screen 120 can serve as an input device for receiving user commands and data. Also, the touch screen 120 can serve as a display device for displaying menus used for operating the mobile communication device and other information such as a state of a received call, battery information, etc.

The touch screen 120 may include a touch screen panel and a touch screen panel controller. The touch screen panel, which is a transparent panel attached onto the exterior of the mobile communication device, may be connected to buses in the mobile communication device. The touch screen panel determines whether the touch screen 120 has been touched. If it is determined that the touch screen 120 has been touched, the touch screen panel may transmit to the touch screen panel controller a signal corresponding to the touch input to the touch screen 120. Then, the touch screen panel controller processes the signal transmitted by the touch screen panel, and transmits data obtained by the processing of the received signal to the controller 160. Accordingly, the controller 160 may determine whether there has been a touch input to the touch screen 120 and what part of the touch screen 120 has been touched based on the data transmitted by the touch screen panel controller.

The manipulation key unit 130 may include keys for making and/or receiving a call and/or for terminating a call, and may receive a user command by transmitting a signal corresponding to whichever key is hit (or touched) by the user to the controller 160. The sound processing unit 140 may amplify a sound signal output by the controller 160 and output the amplified signal to a speaker. Also, the sound processing unit 140 may convert a sound signal input thereto via a microphone into an electrical signal and transmit the electrical signal to the controller 160.

The memory unit 150 stores programs and data needed for the operation of the mobile communication device and various data that the user wishes to store. The memory unit 150 may store a software driver for controlling the touch screen 120. The memory unit 150 can include the internal memory with or without any detachable memory such as a memory card/stick/chip.

The controller 160 controls the operation of the mobile communication device by controlling the components of the mobile communication device such as the wireless communication unit 110, the touch screen 120, the manipulation key unit 130, the sound processing unit 140, and the memory unit 150. More specifically, when there is a need to display an input window for inputting a signal in response to a touch input to the touch screen 120 when a display window for displaying a menu selected from the touch screen 120 is already displayed on the touch screen 120, the controller 160 may control the input window so that the input window can be displayed as a transparent window and can thus be laid over the display window. The transparency level of the input window may be varied by the controller 160 automatically as needed or manually in response to the user's selection of the desired transparency level. Further, a portion of the input window or the entire input window may be disposed over a portion of the display window or the entire display window. Also the size of the input window and the size of the display window with respect to the entire screen size of the mobile communication terminal can vary as desired.

Figure 4:
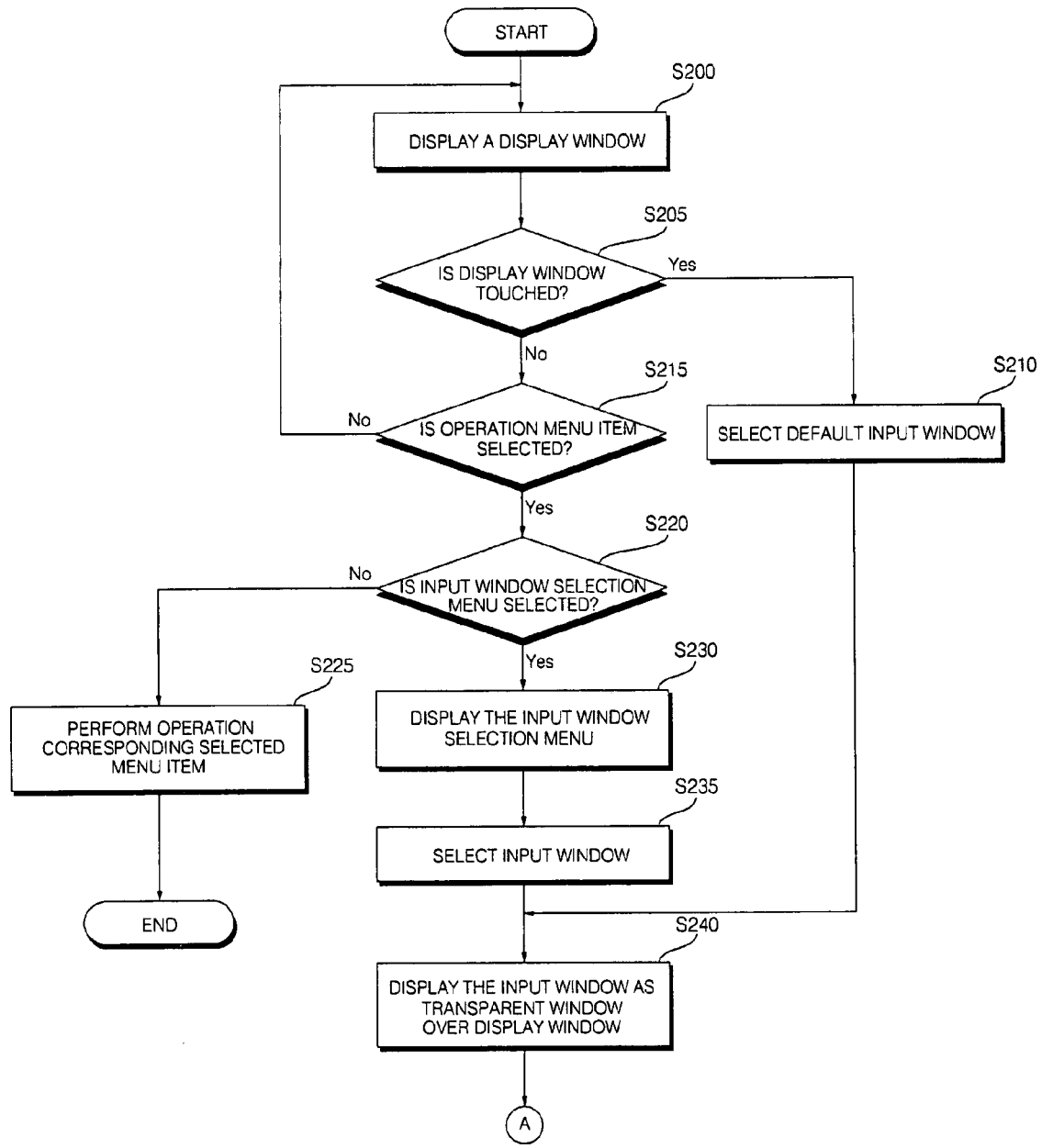
FIGS. 4 and 5 are flowcharts illustrating a method of controlling the operation of a mobile communication device according to an embodiment of the present invention.
Figure 5:
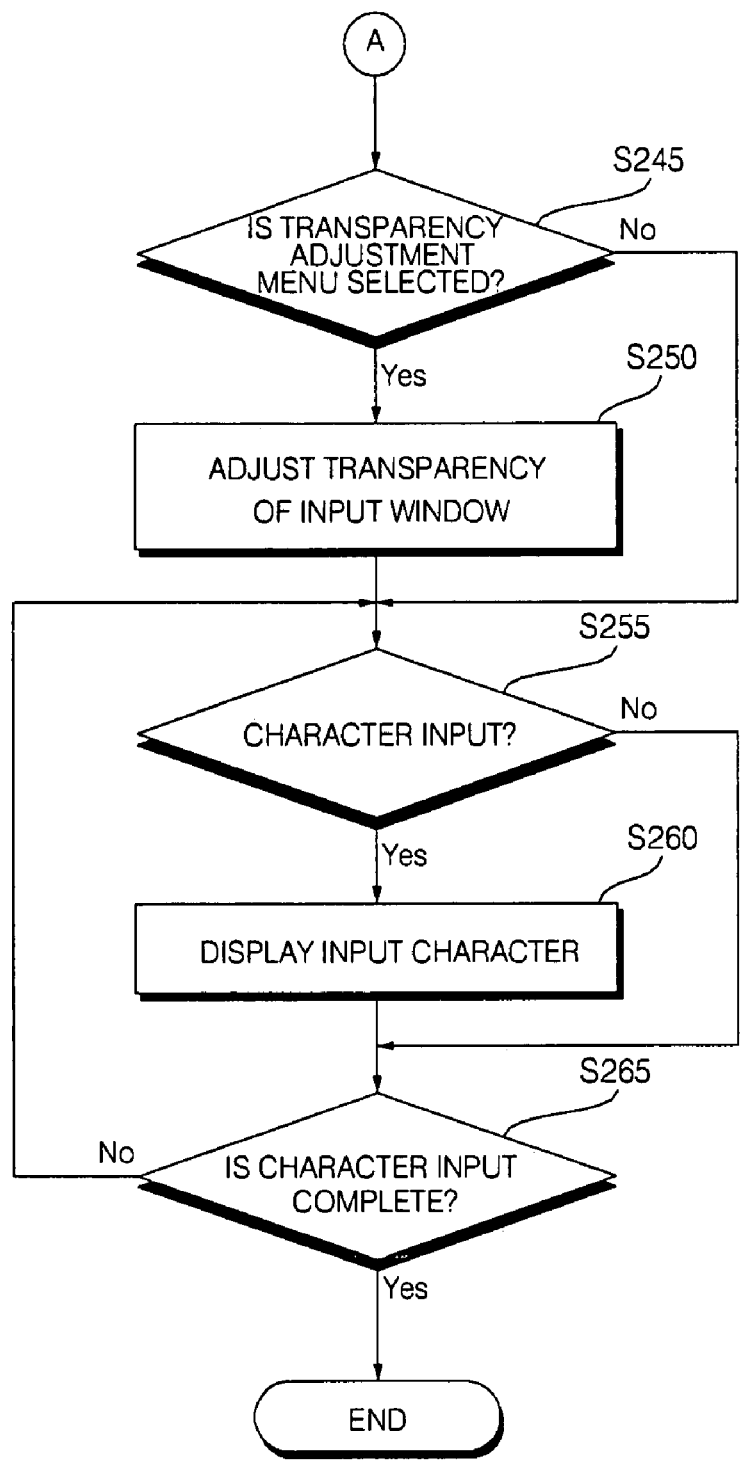

FIGS. 4 and 5 are flowcharts illustrating a method of controlling the operation of a mobile communication device according to an embodiment of the present invention. This method is preferably implemented in the mobile communication device of FIG. 3, but can be implemented in any other suitable device.

Referring to FIG. 4, in operation S200, when a user selects a menu for registering a new phone number or creating a message on the screen of the mobile communication terminal, the controller 160 displays a display window corresponding to the selected menu on the touch screen 120 of the mobile communication terminal.

In operation S205, the controller 160 determines whether there has been a touch input to the display window (e.g., a touch of the display window by the user). In operation S215, if it is determined in operation S205 that there has been no touch input to the display window, the controller 160 determines whether one of a plurality of operation menu items displayed on the touch screen 120 has been selected by the user. The controller 160 may determine whether there has been a touch input to the touch screen 120 and/or what part of the touch screen 120 has been touched according to one or more signals transmitted by the touch screen 120.

In operation S220, if it is determined in operation S215 that one of the operation menu items has been touched and selected by the user, the controller 160 determines whether the selected operation menu item is a menu item for displaying an input window selection menu. In operation S230, if it is determined in operation S220 that the selected menu item is for displaying the input window selection menu, the controller 160 displays the input window selection menu on the screen of the mobile communication terminal. For instance, the input window selection menu as displayed on the terminal screen can be a menu which shows a list of different types of input windows selectable by the user. As an example, the input window selection menu may shows menu items for selecting a keypad input window (e.g., input window showing a keypad, etc.), a handwriting recognition input window (e.g., input window onto which a user can hand-write information, etc.), a continuous handwriting recognition input window (e.g., input window onto which a user can input via continuous handwriting, etc.), and a QWERTY input window. Other examples are possible. Thus, by selecting one of these menu items identified in the displayed input window selection menu, the user can select a particular type of input window that the user desires to use to enter the user's input to the screen. In operation S225, if it is determined in operation S220 that the selected menu item is a menu item, other than the menu item for displaying the input window selection menu, the controller 160 performs an operation corresponding to the selected menu item, for example, a voice call operation.

In operation S235, the user can select a particular input window, by selecting a menu item corresponding to one of the keypad input window, the handwriting recognition input window, the continuous handwriting recognition input window, and the QWERTY input window from the input window selection menu. In operation S240, the controller 160 then controls displaying of the display window and the selected input window, by displaying the selected input window over the display window. Here, the transparency of the selected input window over the display window may vary. For instance, the input window may be displayed as a transparent window, over the display window at the screen 120 of the mobile communication terminal. Further, a portion of the input window or the entire input window may be disposed over a portion of the display window or the entire display window.

On the other hand, in operation S210, if it is determined in operation S205 that there has been a touch input to the display window, a default input window is selected. Thereafter, in operation S240, the controller 160 controls the default input window to be displayed, as a transparent window, over the display window.

Referring to FIG. 5, in operation S245, when the selected input window is displayed as a transparent window, the controller 160 determines whether a transparency adjustment menu for adjusting the transparency of the input window has been selected. In operation S250, if it is determined in operation S245 that the transparency adjustment menu has been selected, the controller 160 adjusts the transparency of the input window according to a transparency level selected from the transparency adjustment menu by the user.

In operation S255, the controller 160 determines whether a character (or any other data or information) has been input through the displayed input window. In operation S260, if it is determined in operation S255 that a character (or other data) has been input to the displayed input window in response to the user's touch input(s) to the touch screen 120, the controller 160 displays the character (or inputted data) in the display window. Operations S255 and S260 may be performed repeatedly until the entire character input operation is completed, i.e., until all the input data have been entered.

According to the present embodiments of the invention, an input window is displayed on a touch screen as a transparent window so that the input window can be laid over at least a portion of a display window, thereby providing a user with both an input window and a display window at the same time even with a small-sized touch screen.

Figure 6:
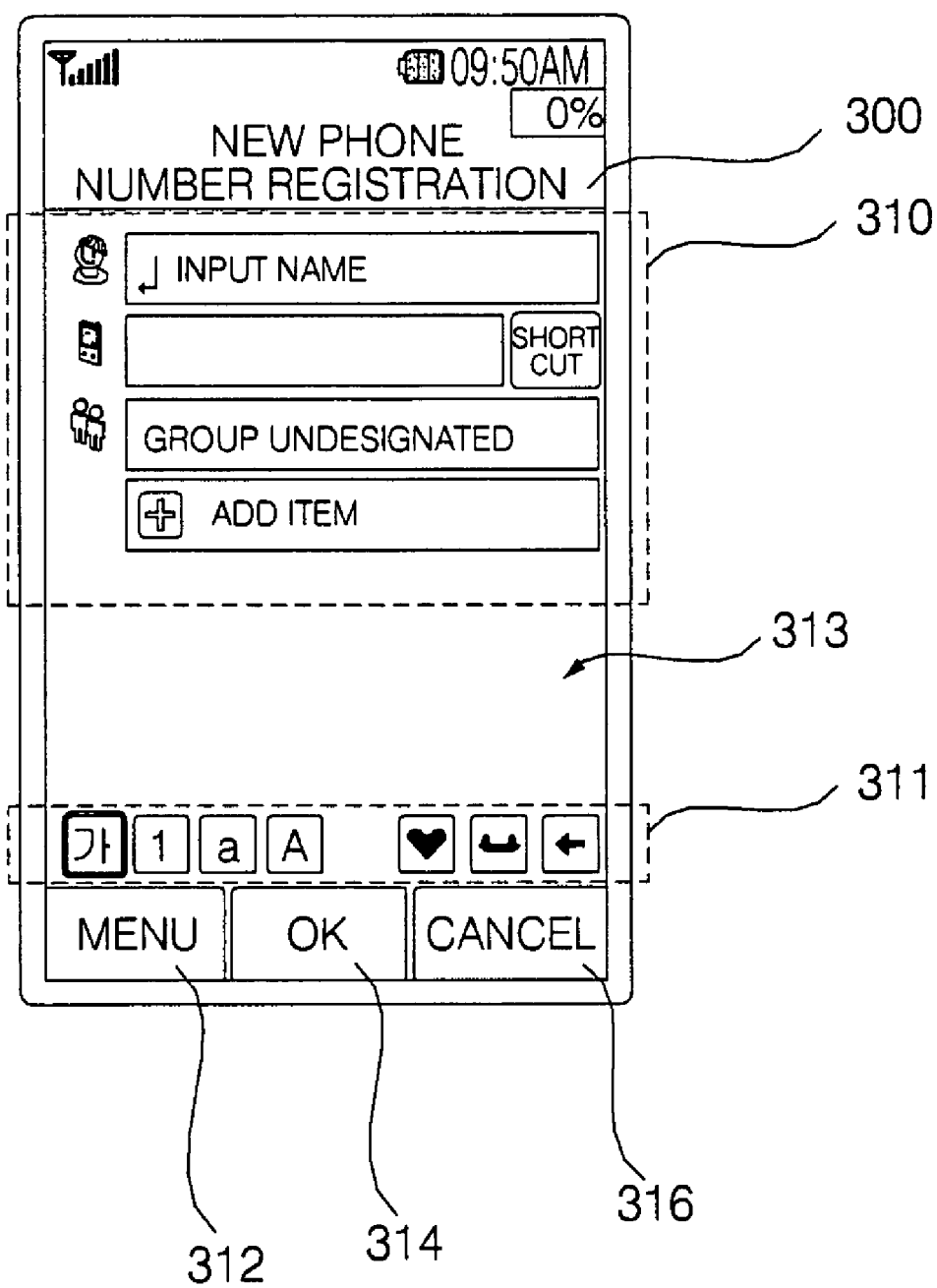
FIGS. 6 through 8 illustrate examples of touch screen images for explaining the method of controlling the operation of a mobile communication device according to an embodiment of the present invention.
Figure 7A:
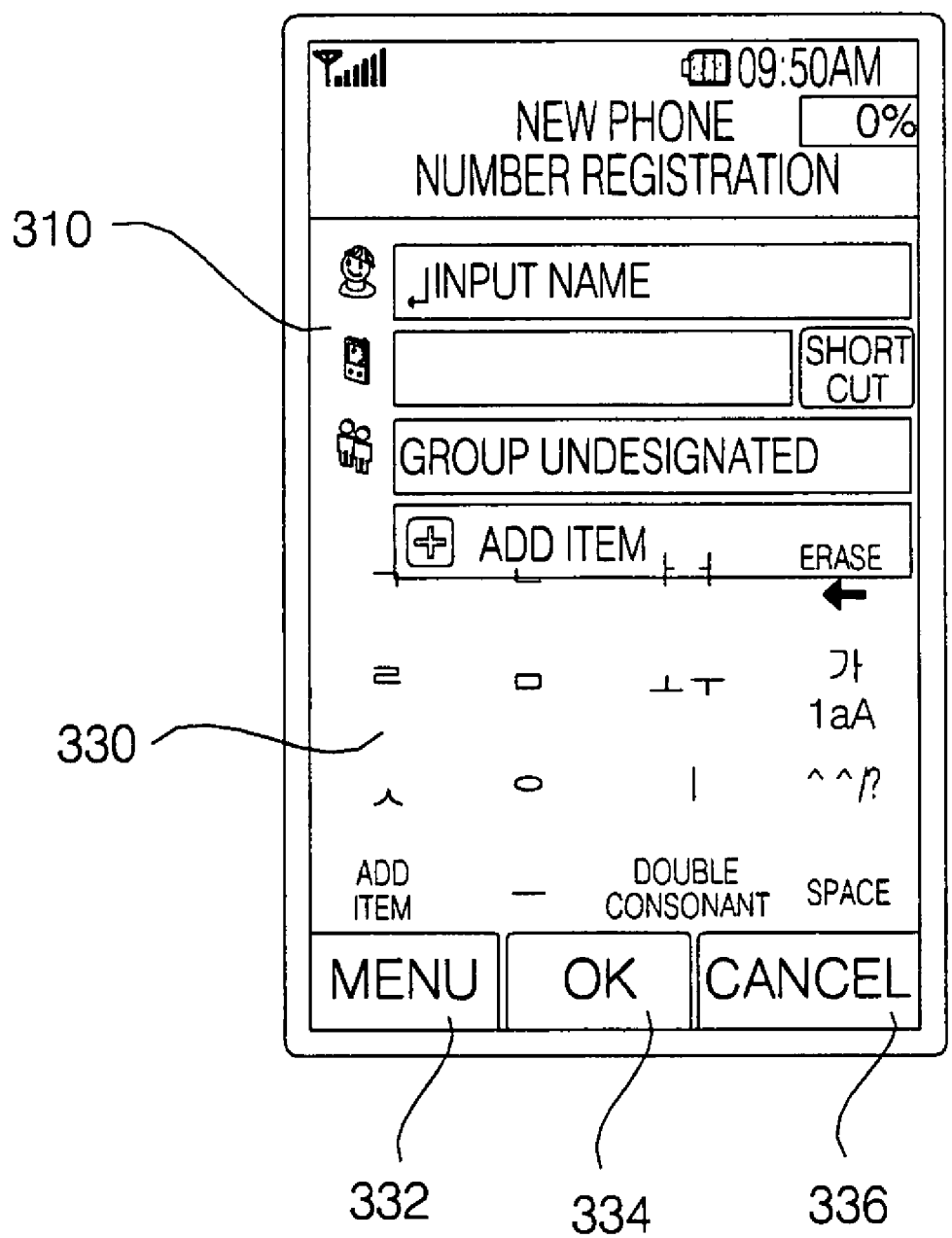
Figure 7B:
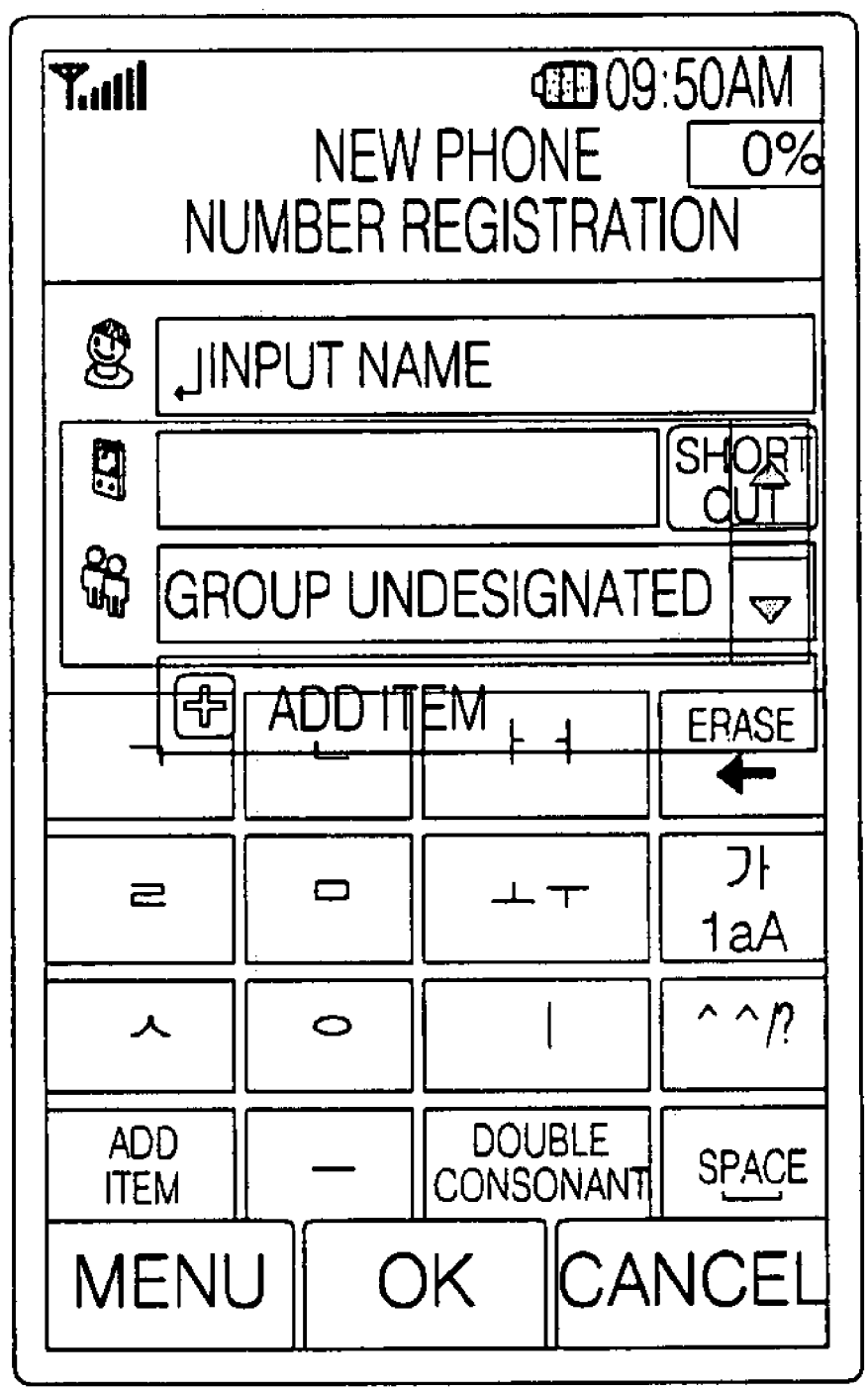
Figure 7C:
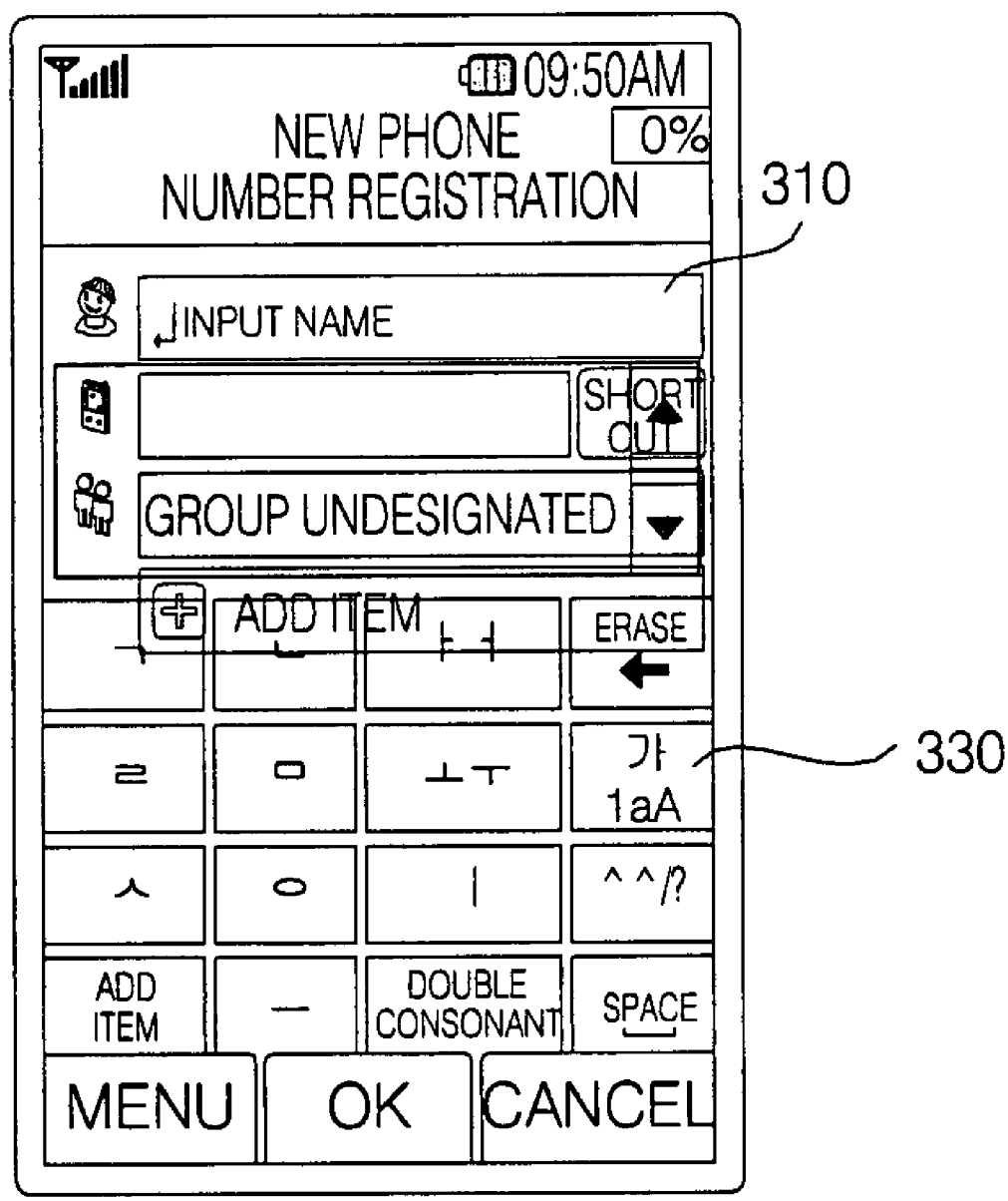
Figure 7D:
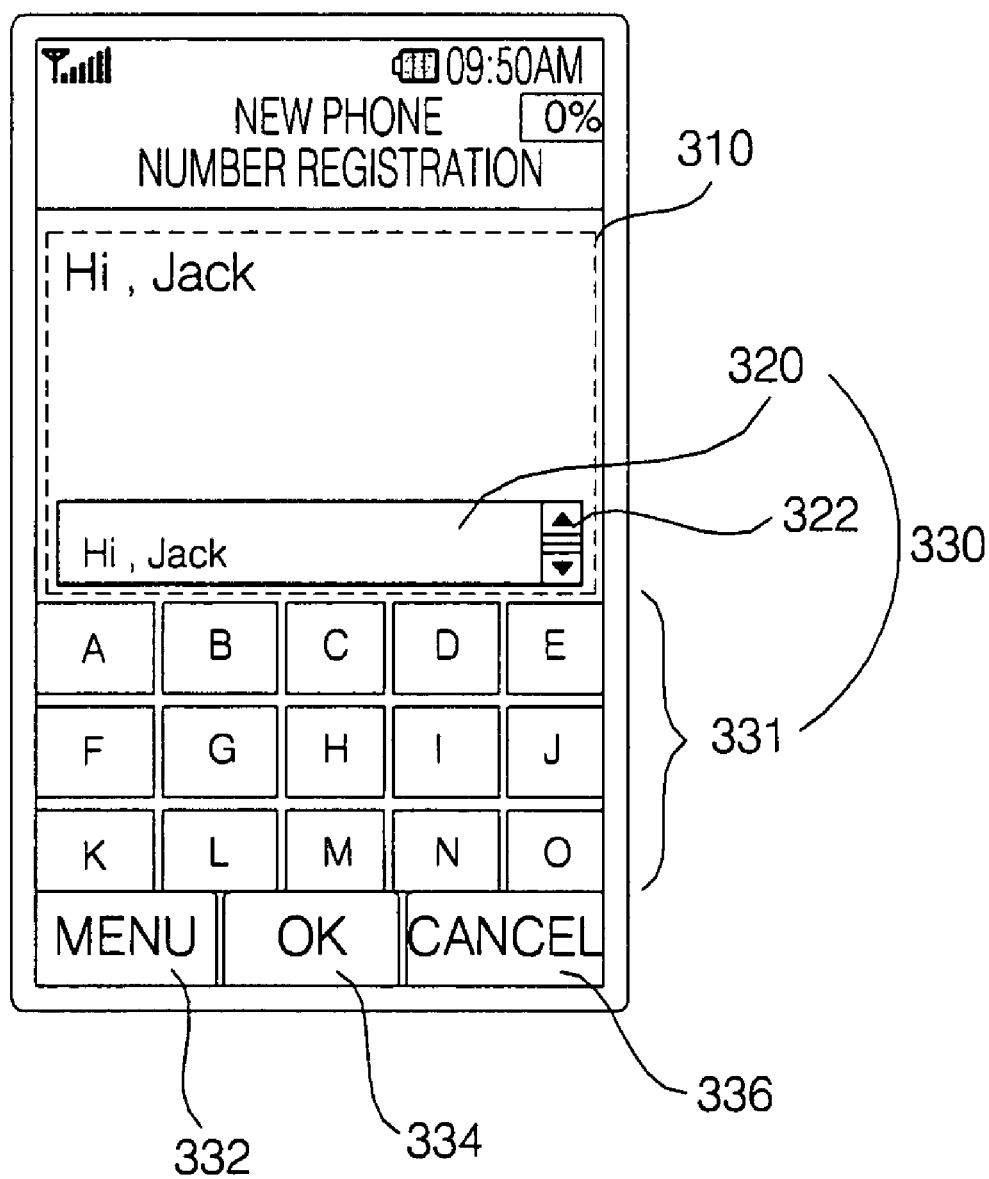
Figure 8:
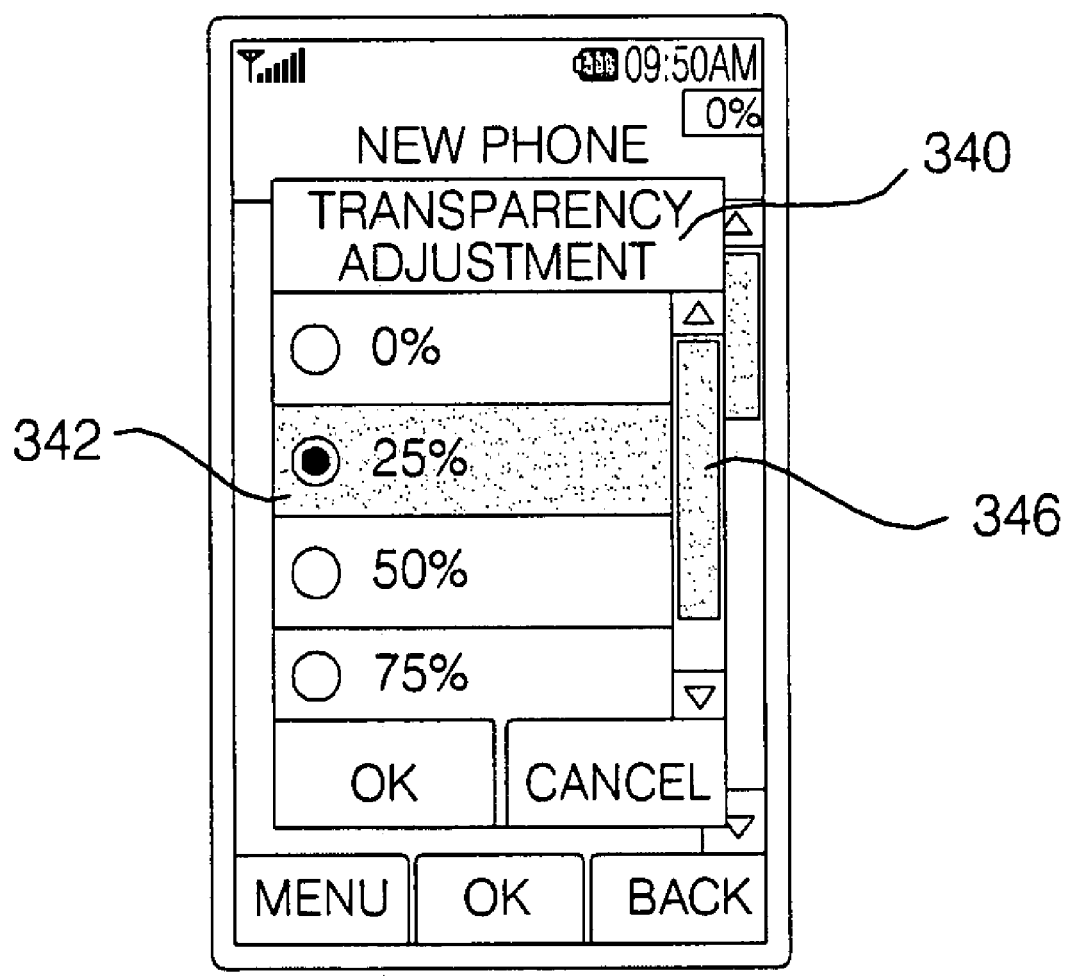

FIGS. 6 through 8 illustrate examples of images displayable on the touch screen 120 of the mobile communication terminal for explaining the method illustrated in FIGS. 4 and 5 according to the present invention.

Particularly, FIG. 6 shows a touch screen 120 showing one example of a touch screen image 300. It should be noted that the entire touch screen 120 or only one or more portions of the touch screen 120 can be configured to be touch-sensitive, as needed.

Referring to FIG. 6, the touch screen image 300 including a display window 310 for registering a new phone number, as an example, is displayed on the touch screen 120 of the mobile communication terminal. The display window 310 displays previously stored/received data or newly input data. Operation menu items such as 'MENU' (312), 'OK' (314), and 'CANCEL' (316) are displayed at the bottom of the touch screen image 300, and a plurality of icons 311 for selecting a Korean input mode, a number input mode, a capital letter input mode, a special character input mode, or a Space/Backspace input mode are displayed above the operation menu items. When a user touches and selects the operation menu item 'MENU' (312) at the bottom of the touch screen image 300, a menu for selecting a type of an input window (e.g., a keypad input window, a handwriting recognition input window, a continuous handwriting recognition input window, or a QWERTY input window) and a menu for controlling an operation (e.g., a voice call operation) of the mobile communication terminal may be displayed. When the user selects a particular input window, then the selected input window can be shown on an area 313 of the screen, so that the user can enter data into the shown input window.

FIGS. 7(a) through 7(c) illustrate examples of touch screen images 300 in which a keypad input window 330 with different transparencies is displayed over a display window 310 according to an embodiment of the present invention. In this example, the input window 330 overlaps only a bottom portion of the display window 310. From FIG. 7(a) to FIG. 7(c), the transparency of the input window 330 decreases (i.e., less transparent & more visible), which in turn causes the underlying display window 310 to be less visible through the overlaid the input window 330. The user can change the transparency level of the input window 330 manually, or the controller 160 may automatically adjust the transparency level of the input window 330 as needed. The user can enter data using the keypad input window 330, and the entered data can be shown on the display window 310. Entry of data into a particular portion/box of the display window 310 can also be achieved by, e.g., selecting/touching that portion/box of the display window 310 and then entering input data using the keypad input window 330. In still another example, if not all the keys can be fit into the keypad input window 330, a scroll key may be provided on a side portion of the keypad input window 330 so that the user can scroll the input window 330 to find and select the desired key(s).

FIG. 7(*d*) illustrates another example of a touch screen image 300 of the touch screen 120 according to an embodiment of the present invention. Referring to FIG. 7(*d*), the keypad input window 330 can include a character input window 331 which displays keys selectable by the user and a current input display window 320 which displays one or more characters that are currently being input to the character input window 331. That is, the current input display window 320 can be provided to show entry of data as the data is being input through the character input window 331. In another example, as the user enters data, the data being input can be shown both in the current input display window 320 and the display window 310. The current input display window 320 may include a screen scroll key 322, e.g., on a side of the current input display window 320, so that the user can scroll through the current input display window 320 to view data entry as desired. The current input display window 320 may be displayed in an area such that the current input display window 320 can be prevented from overlaying the display windows 310.

Although FIGS. 7(*a*)-7(*d*) show the keypad input window 330, other types of input windows can also be used and displayed.

FIG. 8 illustrates an example of a transparency adjustment menu for adjusting the transparency of an input window according to an embodiment of the present invention.

Referring to FIG. 8, the user can select a menu item for displaying a transparent adjustment menu window on the touch screen 120 of the mobile communication terminal. When this menu item is selected, a transparency adjustment menu window 340 is displayed on the screen of the mobile communication terminal. The transparency adjustment menu window 340 displays a plurality of transparency menu items corresponding to different transparency levels and includes a scroll bar 346 for scrolling through the transparency menu items. In the example of FIG. 8, reference numeral 342 indicates the situation when a menu item for selecting a transparency of '25%' is selected. Once one of the transparency menu items is selected from the transparency adjustment menu item 340 and then a menu item 'OK' is selected, the transparency of the input window is adjusted according to the transparency level corresponding to the selected transparency menu item. The manufacturer of the mobile communication terminal can decide how % numbers of the menu items related to the transparency levels can be interpreted.

As described above, according to the present invention, it is possible to display a display window and an input window on a touch screen so that the display window can be laid under at least a part of the input window for inputting characters or others in response to a touch on the touch screen. Therefore, it is possible to efficiently control the operation of a mobile communication device by displaying both a display window and an input window at the same time even on a small-sized touch screen.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meters and bounds of the claims, or equivalence of such meters and bounds are therefore intended to be embraced by the appended claims.

What is claimed is:

1. A method of controlling an operation of a mobile communication terminal equipped with a touch screen, the method comprising:
    displaying a display window on an upper portion of the touch screen;
    displaying a first input window including a first type of keypad for inputting characters on a bottom portion of the touch screen;
    displaying a second input window between the display window and the first input window and overlapping the display window and not overlapping the first input window; and
    displaying a first screen scroll key on a right side of the second input window for scrolling the characters displayed in the second input window and not displaying a second screen scroll key on the first input window when the first screen scroll key is displayed on the right side of the second input window,
    wherein when characters are selected from the first input window, the selected characters are displayed in the second input window and then the same characters are displayed in the display window, and
    wherein when a menu button is selected on a lower left corner portion of the touch screen, a second type of keypad different than the first type of keypad is displayed in the first input window.

2. The method of claim 1, wherein the first type of keypad is a QWERTY character keypad.

3. The method of claim 1, further comprising:
    displaying a list of transparency items corresponding to different transparencies and displaying a transparency adjustment menu for adjusting a transparency of the first input window by touching one of the transparency items; and
    adjusting the transparency of the first input window to correspond to a transparency selected from the transparency adjustment menu.

4. The method of claim 1, further comprising:
    performing communication by selecting a predetermined operation menu item displayed on the touch screen by touch input.

5. The method of claim 1, wherein selection of the menu button comprises:
    displaying a list of different types of keypads that can be selected including at least two of 1) a QWERTY keypad window, 2) a handwriting window and 3) a general keypad window.

6. A mobile communication terminal, comprising:
    a wireless communication unit configured to wirelessly communicate with at least one other terminal;
    a display configured to display a display window on an upper portion of the touch screen, to display a first input window including a first type of keypad for inputting characters on a bottom portion of the touch screen, to display a second input window between the display window and the first input window and overlapping the display window and not overlapping the first input window, and to display a first screen scroll key on a right side of the second input window for scrolling the characters displayed in the second input window and not displaying a second screen scroll key on the first input window when the first screen scroll key is displayed on the right side of the second input window; and a controller configured to control, when characters are selected from the first input window, the display to display the selected characters in the second input window and then display the same characters in the display window, and when a menu button is selected on a lower left corner portion of the touch screen, to display a second type of keypad different than the first type of keypad in the first input window.

7. The mobile communication terminal of claim 5, wherein the first type of keypad is a QWERTY character keypad.

8. The mobile communication terminal of claim 5, wherein the display is further configured to display a list of transparency items corresponding to different transparencies, and to display a transparency adjustment menu for adjusting a transparency of the display window by touching one of the transparency items, and wherein the controller is further configured to adjust the transparency of the display window to correspond to a transparency selected from the transparency adjustment menu.

9. The mobile communication terminal of claim 5, wherein the wireless communication unit is configured to perform communication when a predetermined operation menu item displayed on the touch screen is selected by touch input.

10. The mobile communication terminal of claim 5, wherein when the menu button is selected, the display is further configured to display a list of different types of keypads that can be selected including at least two of 1) a QWERTY keypad, 2) a handwriting keypad and 3) a symbol/numeral keypad.

* * * * *